Sept. 24, 1935.  W. LELGEMANN  2,015,529
PROCESS OF TREATING HYDROCARBON PRODUCTS
Original Filed May 15, 1934
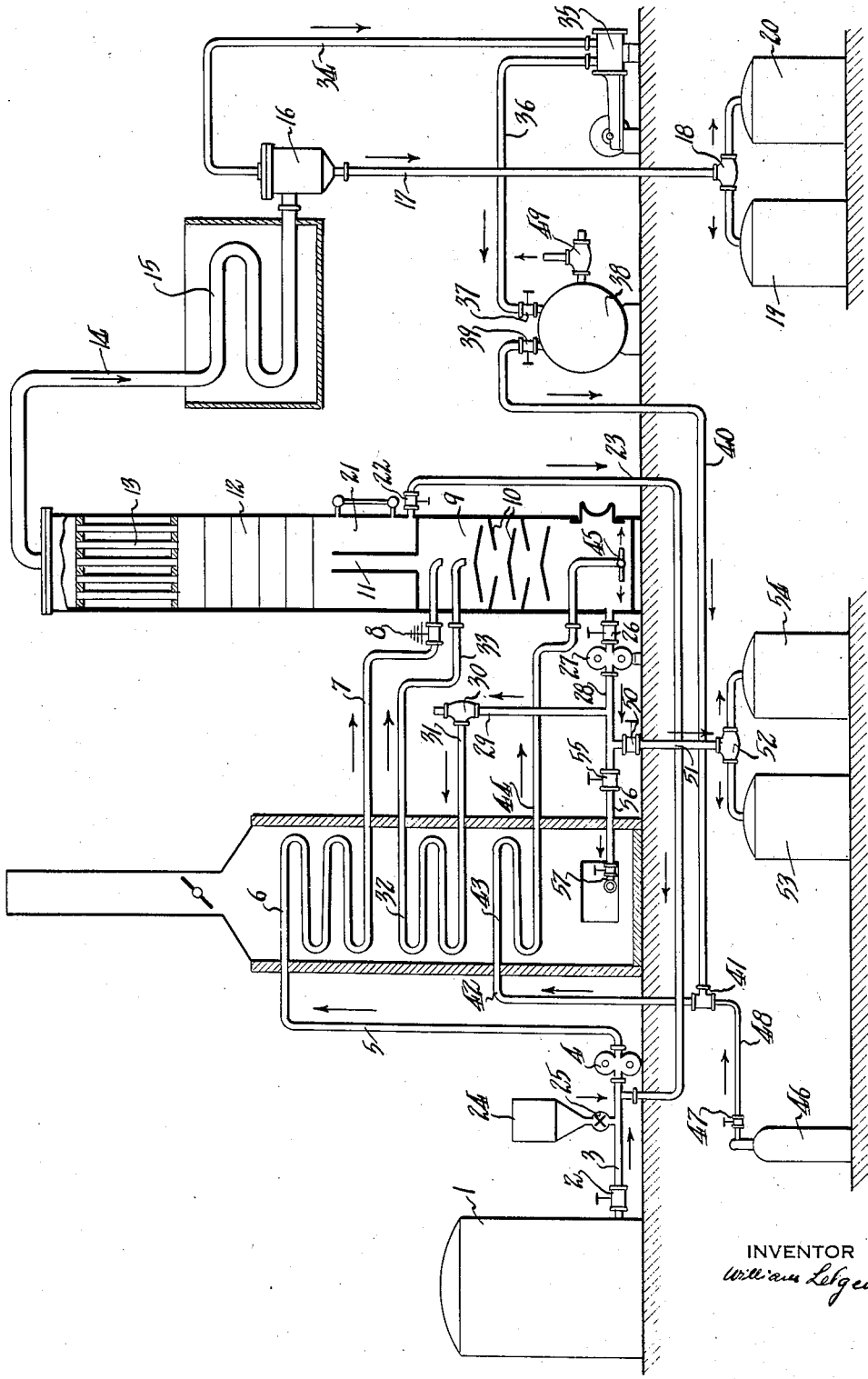
INVENTOR
William Lelgemann Patented Sept. 24, 1935

2,015,529

UNITED STATES PATENT OFFICE 2,015,529

PROCESS OF TREATING HYDROCARBON PRODUCTS

William Lelgemann, Newark, N. J.

Application May 15, 1934, Serial No. 725,703
Renewed August 23, 1935

3 Claims. (Cl. 196—52)

This invention is a continuation in part of my invention "Process of treating hydrocarbon products", being Serial No. 631,382, filed September 1, 1932, now Patent No. 1,971,190.

This invention relates to a process for treating an oil or mixture of oils or materials containing the same and containing hydrocarbons, such as petroleum and other mineral oils, shale oil, etc., and distillates, fractions or residues obtained therefrom or admixed therewith, and other hydrocarbons and hydrocarbonaceous mixtures of relatively high boiling point, into a lower boiling, more easily vaporizable or more volatile material, in order to produce therefrom a gasolene substitute and a liquid capable of direct use in an internal combustion engine.

Depending upon the nature and composition of the raw material as to its physical constants and chemical composition which is being operated upon, I may produce either aliphatic hydrocarbons of a mixture in which aliphatic hydrocarbons predominate, or carbocyclic mixtures such as benzene, its homologues and isologues, or mixtures containing members of both open and closed chain hydrocarbons and derivatives thereof or obtained therefrom.

By means of my invention, mixtures of hydrocarbons of relatively lower boiling points are obtained from hydrocarbon mixtures boiling at relatively higher temperatures, and not only are suitable mixtures of oil vapor containing little or no tarry matter obtained, but the process may be operated intermittently or continuously as desired, in the absence of entering steam into the mixture, at normal or elevated atmospheric pressure, thus obviating the necessity for the employment of intricate and costly equipment, and admitting of a product being continuously produced of uniform range of physical constants and rate of combustion. My process to be described herein is especially applicable for the production of a gasoline or automobile or engine fuel of high octane number.

As suitable raw material I may employ, in addition to those mineral oils containing paraffins or paraffin bases primarily or alone, other bodies such as asphalts or fractions thereof or therefrom, distillates or residues, or oils containing aromatic substance such as crude creosote or creosotic bodies, crude naphthalenes and naphthalenic bodies, etc., for the production of benzene and other hydrocarbons, and the preparation of technical, pharmaceutical and medicinal products therefrom.

One method of carrying my process into effect is illustrated in the attaching drawing in which the oil to be cracked enters the process from tank 1, through valve 2, pipe 3, pump 4, pipe 5, heating coil 6, pipe 7, expansion valve 8, into reaction tower 9, and flows over filming contact plates 10, to the lower part of reaction tower 9. The rising hydrocarbon vapors pass through pipe 11, into fractionating tower 12, reflux condenser 13, pipe 14, to condenser 15. The light fractions are condensed here and the liquid product flows through gas separator 16, pipe 17, valve 18, into tanks 19 and 20.

The reflux formed in condenser 13 and fractionating tower 12 flows back into reflux tank 21, and from here through valve 22, pipe 23, into pipe 3, and thence back through pump 4, pipe 5, heating coil 6, pipe 7, valve 8, into reaction tower 9.

The catalytic material, (oxides or chlorides) enters the process from storage tank 24 through automatic feeder 25 into pipe 3 and in pump 4 is thoroughly mixed with the crude charging oil and enters the process in the same way as the charging oil.

To maintain the constant reaction temperature in the lower part of reaction tower 9 the oil-catalyzer mixture is kept in constant circulation through valve 26, pump 27, pipes 28 and 29, reducing valve 30, pipe 31, heating coil 32, pipe 33, back into reaction tower 9 and over contact plates 10 to lower part of reaction tower 9.

To keep the hot oil in agitation and prevent settling of catalytic oxides, a part of the fixed gas formed in the cracking process is used as an agitating medium. This gas enters from gas separator 16 through pipe 34, compressor 35, pipe 36, valve 37, pressure tank 38, valve 39, pipe 40, injector 41 and is here mixed with the necessary NOCL out of tank 46, through valve 47, pipe 48, and this gaseous NOCL mixture is led through pipe 42, heating coil 43, pipe 44, distributor 45 into reaction tower 9.

The excess fixed gas leaves tank 38 through valve 49 and can be burned under still.

A part of the cycling oil is drawn off as residue through valve 26, pump 27, pipe 28, valve 50, pipe 51, valve 52 to tanks 53 and 54.

Part of the residuary cycling oil can be taken from tower 9 through valve 26 pump 27 pipe 28 valve 55 pipe 56 to oil burner 57.

In the description following, I make use of the term "hydrocarbon" or "hydrocarbons" in a general sense to designate mixtures such as mineral oils, shale oil, schist oil, and asphaltic bases, as well as residues, fractions and distillates therefrom and the like, being suitable raw materials applicable to my process to be herein set forth. One of the objects of this invention relates to an improved continuous heat treatment for "hydrocarbons" and the manufacture therefrom and thereby of a highly refractive, very mobile, volatile and inflammable spirit, which has a wide solvent power for a large number of chemicals and substances in addition to its value as a gasolene or substitute therefor.

One of the principal obstacles encountered in processes of this nature heretofore has been the deposition of carbon on the inner surfaces of the pipes in the apparatus in which the oil is heated, which not only renders it increasingly difficult to transmit external heat through the walls of the chamber or pipes to the interior, but the carbon has ultimately clogged up the passages to the point where the apparatus has been rendered ineffective or inoperative. This and similar difficulties are obviated in my process, or are apparent to such a minimum degree as not to seriously interfere with the operating efficiency of the process as a whole. In my process herein described, the relatively small amount of carbon formed seems to be in a colloidal or highly dispersed condition, which does not deposit upon the walls of the pipe or apparatus, at least not in an objectionable amount.

The commonly used modes of treating petroleum are reflux distillation followed by progressive distillation generally fractional, in which the different hydrocarbon compounds and mixtures (the so-called "cuts") are successively distilled off in the order of their relative volatility.

My improved method, which may be intermittent but preferably continuous, comprises catalytic and distillatory actions, thereby forming lower boiling and more valuable compounds from higher boiling and less expensive mixtures. Broadly, it comprises heating the raw material containing hydrocarbons by means of an appropriate source of heat, usually direct heating, applied in an advantageous manner, whereby the vapors are condensed by means of a reflux condenser.

The amount, and physical constants and chemical composition of the fraction or fractions obtained, depend upon 1 the nature of the raw material; 2 the heating temperature; 3 the constants of the materials obtained in the distillation process; 4 the nature and amount of catalytically acting material employed; and 5 the and temperature factor in the various stages or phases of the operation.

The degree of heat applied to the hydrocarbon raw material in the heating chamber will vary, depending upon the nature of the raw material operated upon, the speed with which the process is carried on, and the physical constants desired in the finished product. But always, the finished product has a susbtantially lower boiling point and more ready evaporation and speed of vaporization, than the raw material from which it is produced.

As catalytic material I prefer to use a halogenated oxide of nitrogen in conjunction with powdered aluminum metal, or in conjunction with an aluminum alloy, such as aluminum bronze, both metal or alloy being in a very fine state of subdivision, all in conjunction with, and for the transformation of, relatively higher boiling hydrocarbon combinations or mixtures into those of relatively lower boiling point range.

Especially is my process applicable to the treatment of high grade, low viscosity fuel oil for the production of gasoline and motor fuels therefrom.

As an illustration of one method of operation under my process, using, for example, nitrosyl chloride and finely divided aluminum, I may admix the aluminum with the raw stock in an intimate manner and in any appropriate way, in the proportion of one-half to one and one-half pounds of aluminum to one barrel of raw stock. I may also incorporate the aluminum or aluminum alloy with the raw stock at a temperature above normal atmospheric, if desired.

It is essential that the aluminum be finely divided and that admixture with stock be uniform for best results. Any suitable stirring or admixing apparatus may be employed for this purpose.

The nitrosyl chloride may be added to the charge in various ways, as by incorporating with the raw stock in the cold, and preferably after the aluminum or aluminum alloy has been admixed with the stock. Or, the nitrosyl chloride may be added with the aluminum or aluminum alloy at one and the same time.

Where the aluminum is added to the raw stock first, I then have found it preferable in some instances to introduce the nitrosyl chloride while the temperature of the stock is around 200° F. Or, the nitrosyl chloride may be introduced directly into the still containing the raw stock and aluminum admixed therewith under about 150 pounds pressure, and this is the method preferred by me.

From 3 to 16 ounces nitrosyl chloride per barrel of raw stock is used, and the nitrosyl chloride, of course, being admitted in a continuous manner, or substantially so. I find that seldom more than 8 ounces nitrosyl chloride per barrel of raw stock is required to obtain the desirable results of high yield of low boiling distillate.

While it is not necessary that the nitrosyl be added to the raw stock continuously, in my experience I find it is preferable to do so, as it ensures a more uniform distillate, and a distillate of more uniform composition, that is, of more desirable physical characteristics. I have found great variation in the amount of powdered aluminum required, depending upon the fineness of subdivision of the aluminum, and also the composition of the raw stock operated upon. In many cases 100 grams aluminum per barrel of raw stock has been found sufficient in conjunction with the amount of nitrosyl chloride above stated in order to obtain abnormally high yields of lower boiling hydrocarbons suitable as gasolene and for motor purposes from hydrocarbon mixtures of relatively higher boiling point.

Instead of powdered aluminum metal, I may use in approximately the same proportion, powdered aluminum alloys as aluminum bronze, or other aluminum-copper or aluminum-copper-zinc combinations. If aluminum metal or other aluminum metal alloy is employed, I prefer to incorporate it with the raw stock either before, with, or after incorporation of lime with the stock if lime is used, or if aluminum replaces entirely the lime, then I prefer to introduce it with the raw stock either in the cold or at moderately high temperatures.

This method may be modified within wide limits according to the relative refractivity of the raw material, its composition, the degree of heat applied, and the temperature and physical characteristics of the cut or fraction distilled off that it is desired to obtain. The amount of nitrosyl chloride to be used will be governed to some extent by the relative refractivity and physical constants of raw material operated upon and the constants desired in the finished material, as is well known to those conversant with this particular art.

The above example is given merely for illustrative purposes, and may be varied within wide limits and still conserve the spirit and essence of my invention, which is the decomposition of hydrocarbons into hydrocarbon mixtures of relatively lower boiling points and suitable as a substitute for gasolene, obtained by heating the raw stock in the presence of nitrosyl chloride, and also in the presence of aluminum or an aluminum alloy, said compound to be in an extremely fine state of subdivision for best results as herein explained.

I claim:

1. A process for the continuous treatment of relatively high boiling hydrocarbon mixtures to obtain relatively lower boiling hydrocarbons suitable as gasolene, automobile or engine fuel of high octane number, comprising mixing the raw stock with powdered aluminum in proportion of about 3 ounces to one barrel of stock, introducing the mixture into a still heated from underneath, bringing the temperature of said still to a temperature of about 800° F., then introducing continuously nitrosyl chloride into said still in the proportion of about one pound said nitrosyl chloride per 100 gallons raw stock, continuing the addition of raw stock containing lime and nitrosyl chloride addition for an indeterminate period, meanwhile leading off the fractions of relatively lower boiling points and condensing the same, substantially as herein described.

2. A process for the continuous treatment of relatively high boiling hydrocarbon mixtures to obtain relatively lower boiling hydrocarbons suitable as gasolene, automobile or engine fuel of high octane number, comprising mixing the raw stock with powdered aluminum bronze in proportion of about 3 ounces to one barrel of stock, introducing the mixture into a still heated from underneath, bringing the temperature of said still to a temperature of about 800° F., then introducing continuously nitrosyl chloride into said still in proportion of about one pound said nitrosyl chloride per 100 gallons raw stock, continuing the addition for an indeterminate period, meanwhile leading off the fractions of relatively lower boiling points and condensing the same, substantially as herein described.

3. A process for the continuous treatment of relatively high boiling hydrocarbon mixtures to obtain relatively lower boiling hydrocarbon suitable as gasolene, automobile or engine fuel of high octane number, comprising mixing the raw stock with powdered aluminum alloy in proportion of about three ounces to one barrel of stock, introducing the mixture into a still heated from underneath, bringing the temperature of said still to a temperature of about 800° F., then introducing continuously nitrosyl chloride into said still in proportion of about one pound said nitrosyl chloride per 100 gallons raw stock, continuing the addition for an indefinite period, meanwhile leading off the fractions of relatively lower boiling points and condensing the same, substantially as herein described.

WILLIAM LELGEMANN.